United States Patent Office 3,181,915
Patented May 4, 1965

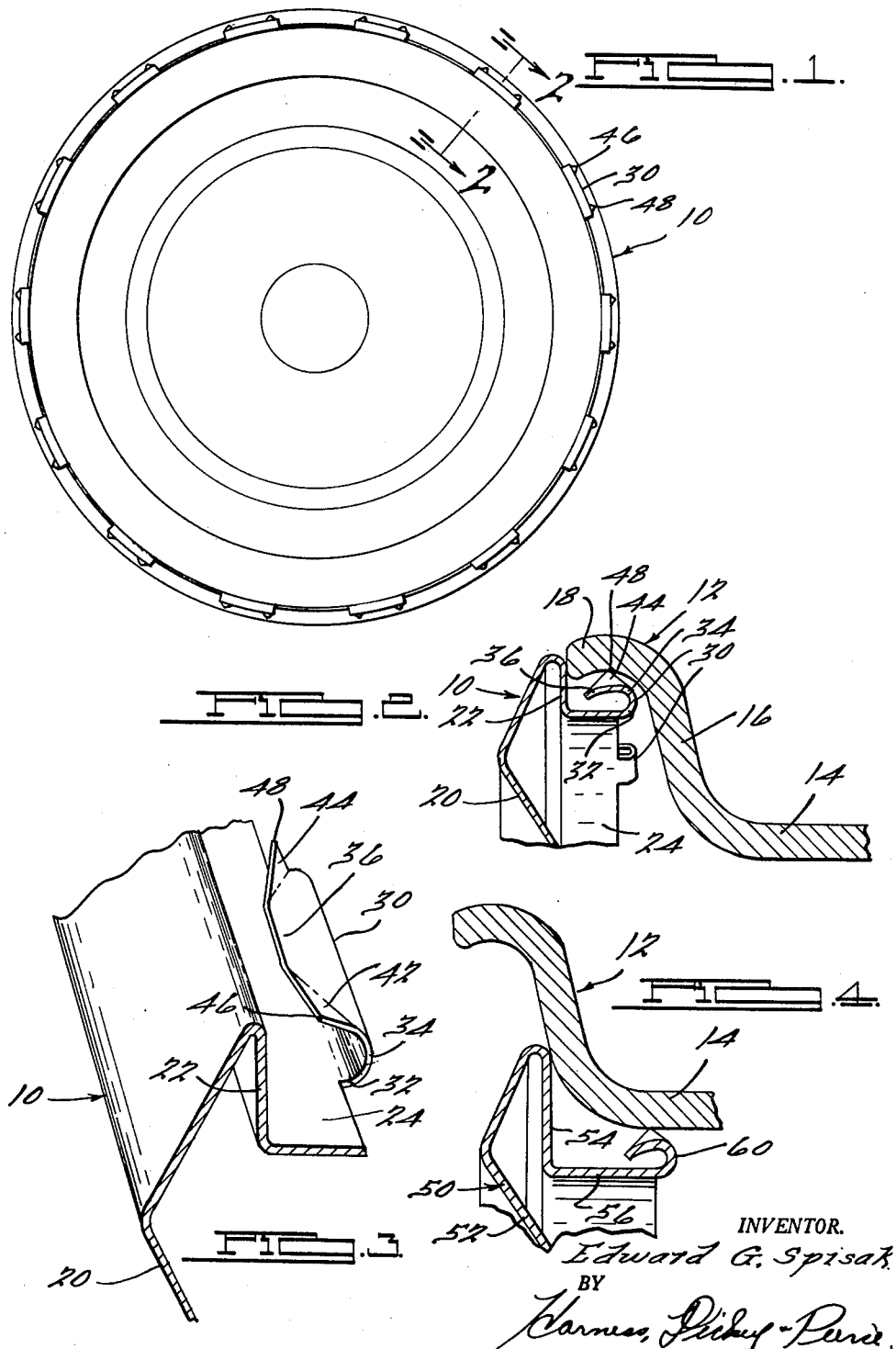

3,181,915
WHEEL COVER
Edward G. Spisak, Wayne, Mich., assignor to Gar Wood Industries, Inc., Wayne, Mich., a corporation of Michigan
Filed Mar. 10, 1961, Ser. No. 94,737
1 Claim. (Cl. 301—37)

This invention relates generally to decorative covers for the wheels of a motor vehicle and more particularly to an improved means for retaining such wheel covers on the vehicle wheels.

Decorative wheel covers for the wheels of a motor vehicle must satisfy a pair of seemingly irreconcilable requirements, namely, that they be positively engageable with the vehicle wheels, yet be readily removable therefrom to provide access to the outer face of the wheels. These diverse requirements are best satisfied by a wheel cover that is resiliently engageable with the vehicle wheel so as to be capable of absorbing road shock, vibration, and wheel deformation, yet be relatively easily removable from the face of the vehicle wheel.

A wheel cover provided with the retaining means of the present invention exhibits unexpectedly improved holding power on a vehicle wheel as compared to wheel covers heretofore known and used. Yet, a wheel cover having the herein disclosed cover retaining means is relatively easily applied to and removed from a vehicle wheel thereby to satisfy the foregoing requirements to a heretofore unknown degree.

A wheel cover in accordance with the present invention comprises a decorative frontal face having an annular retainer flange extending axially rearwardly thereof. The retainer flange has a plurality of reentrantly folded axially extending retaining fingers of generally rectangular tangential cross section, opposite terminal corner portions of which are folded angularly and radially outwardly about axes generally normally related to one another and angularly related to the central axis of the wheel cover. The terminal corner portions define a pair of teeth on opposite corners of the reentrantly folded fingers. The teeth are bitingly engageable with an axially extending flange on the vehicle wheel to maximize holding power of the wheel cover on the vehicle wheel.

Accordingly, one object of the present invention is a wheel cover that is relatively easily applied to and removed from the face of the vehicle wheel.

Another object of the invention is an improved retaining means for a wheel cover.

Another object is a retaining means for a wheel cover that is engageable with a vehicle wheel in point engagement to maximize the holding power of the wheel cover on the vehicle wheel.

Other objects and advantages of the present invention will become apparent from the following detailed description, claim and drawings, wherein:

FIGURE 1 is a rear view of a wheel trim having the improved retaining means of the present invention;

FIG. 2 is a cross sectional view taken substantially along the line 2—2 of FIGURE 1;

FIG. 3 is a fragmentary perspective view of the retaining means of FIG. 2; and

FIG. 4 is a cross sectional view, similar to FIG. 2, of a modified retaining means.

More particularly, a wheel cover 10, in accordance with an exemplary embodiment of the present invention, is shown in association with a conventional vehicle wheel 12. The wheel 12 has an axially extending wheel flange 14, a radially outwardly extending flange 16 and an axially extending terminal flange 18. The wheel trim 10 is retained on the axially outer face of the vehicle wheel 12 by engagement of the axially extending terminal flange thereof, as will be described. It is to be understood that the terms "axially outwardly" and "axially inwardly" used hereinafter, are relative terms used to orientate the structural elements of the cover 10 and wheel 12.

The wheel trim 10 comprises an outer face 20, a radially extending flange 22 spaced axially inwardly of the outer face 20, and an axially inwardly extending retainer flange 24. The particular configuration of the outer face 20 forms no part of the present invention, it being understood that the face 20 may cover the wheel 12, as shown, or alternatively, cover only a portion of the wheel 12.

In accordance with the present invention, the wheel cover 10 is retained on the vehicle wheel 12 by a plurality of retaining fingers 30. Because each of the fingers 30 is similar in construction, only one finger 30 will be described hereinafter. Each finger 30 has an axially inwardly extending portion 32, a portion 34 that is reentrantly folded with respect to the retainer flange 24, and an axial outwardly extending terminal portion 36. The terminal portion 36 of the finger 30 is of generally rectangular tangential configuration, the axially outer corner portions 42 and 44 thereof being folded radially outwardly about axes extending generally normally to one another and at angles of approximately 45 degrees to the central axis of the wheel cover 10.

In an exemplary constructed embodiment, the corner portions or teeth 42 and 44 on the terminal portion 36 of the finger 30, are folded radially outwardly at substantially 45 degrees to the terminal portion 36 so that the points 46 and 48 engage the terminal flange 18 of the wheel 12 in what is in fact point engagement, thereby to maximize biting engagement thereof with the wheel 12. This construction of the teeth 42 and 44 on the finger 30 materially increases the holding power of the wheel trim 10 on the vehicle wheel 12. The terminal portion 36 to the finger 30 is stiffened circumferentially by the reentrantly folded portion 34 thereof so that the fingers 30 are essentially cantilevered beams that flex about an axis generally tangentially related to the retainer flange 24 upon installation of the wheel trim 10 on the wheel 12. Also, because the teeth 42 and 44 are folded about axes that are angularly related to the central axis of the wheel cover, the teeth 42 and 44 preclude indexing of the wheel cover 10 with respect to the wheel 12.

When the wheel cover 10 is not installed on a vehicle wheel 12, the joints 46 and 48 on the fingers 30 lie in a circle of relatively greater diameter than the inside diameter of the terminal flange 18 on the wheel 12. Upon installation of the wheel cover 10, the teeth 42 and 44 function as cams to bias the terminal portion 36 of the fingers 30 radially inwardly thereby stressing the fingers 30 and rendering installation of the cover 10 on the wheel 12 relatively smooth and positive. After installation, this reaction force engendered by the radially inward flexure of the fingers 30 tends to bias points 46, 48 on the teeth 42 and 44 thereof radially outwardly into biting contact with the wheel 12.

Thus, the folded corner portions or teeth 42 and 44 on the terminal portions 36 of the fingers 30 serve three distinct yet mutually complementary functions, namely, to bitingly engage the vehicle wheel to hold the wheel cover 10 thereon, to function as cams to effect radially inward flexure of the fingers 30 upon installation of the wheel trim 10 on the wheel 12, and to preclude indexing of the wheel trim 10 with respect to the wheel 12.

Referring now to FIGURE 4, a modified or "¾ full" wheel cover 50 comprises a frontal face 52 having a radially extending flange 54 therebehind, an axially extending retainer flange 56 and a reentrantly folded retaining finger 60. The retaining finger 60 is similar in construction to the retaining finger 30 described hereinbefore, the sole difference between the wheel covers 10 and 50 of FIGURES 2 and 4, respectively, being the length of the radially and axially extending flanges, and the diameter of the wheel cover. Thus, the novel retaining means of the present invention is equally applicable to the "full" wheel cover 10 of FIGS. 1–3, and to the "¾ full" wheel cover 50 of FIG. 4.

It is to be understood that the specific construction for a decorative wheel cover herein disclosed and described is presented for the purpose of explanation and illustration and is not intended to indicate limits of the invention, the scope of which is defined by the following claim.

What is claimed is:

A wheel cover for disposition on the axially outer face of a vehicle wheel having an annular axially extending wheel flange, said wheel cover comprising:

an annular axially extending retainer flange receivable radially inwardly of the wheel flange on the vehicle wheel, and a plurality of circumferentially spaced cantilevered retaining fingers extending from an axially inner edge portion of said retainer flange, each of said retaining fingers having a cantilevered axially inwardly extending portion of uniform circumferential width, a reentrantly folded portion at the inner end of said axially inwardly extending portion of circumferential width substantially equal to the width of said axially inwardly extending portion, and a cantilevered axially outwardly extending portion of circumferential width substantially equal to said axially inwardly extending portion and extending from said reentrantly folded portion in radially outwardly spaced generally parallel relation to said retainer flange, said axially outwardly extending portion having a generally rectangular axially outer end thereon, and a pair of generally triangular circumferentially spaced angularly radially and axially outward and oppositely circumferentially extending teeth defined by the adjacent normally orientated axially and circumferentially extending edge faces on said axially outer end portion, the junctures of the axially and circumferentially extending edge faces on said outer end portion defining relatively sharp points at the apexes of said teeth, respectively, engageable with the axially extending flange on the vehicle wheel in biting engagement, whereby said retaining finger comprises a pair of radially spaced cantilevered portions spaced axially inwardly from said retainer flange.

References Cited by the Examiner

UNITED STATES PATENTS 2,882,096 4/59 Lyon _____ 301—37
2,902,317 9/59 Lyon _____ 301—37
2,989,345 6/61 Lyon.

ARTHUR L. LA POINT, *Primary Examiner.*

JACOB A. MANIAN, RICHARD A. DOUGLAS, ROBERT C. RIORDON, *Examiners.*